United States Patent [19]

Gupta et al.

[11] Patent Number: 4,538,159
[45] Date of Patent: Aug. 27, 1985

[54] CERAMIC OVERCOATED OPTICAL RECORDING ELEMENT

[75] Inventors: Mool C. Gupta, W. Webster; Joseph J. Wrobel, Rochester; Dennis G. Howe, Pittsford, all of N.Y.

[73] Assignee: Eastman Kodak Company, Rochester, N.Y.

[21] Appl. No.: 600,643

[22] Filed: Apr. 16, 1984

[51] Int. Cl.³ .................. G01D 15/34; G03C 1/76
[52] U.S. Cl. .................. 346/135.1; 346/76 L; 430/346; 430/945
[58] Field of Search .............. 346/135.1, 76 L; 430/346, 945

[56] References Cited

U.S. PATENT DOCUMENTS

| | | |
|---|---|---|
| 4,069,487 | 1/1978 | Kasai et al. |
| 4,101,907 | 7/1978 | Bell et al. |
| 4,300,143 | 11/1981 | Bell et al. |
| 4,314,262 | 2/1982 | Reilly |
| 4,334,233 | 6/1982 | Murakami |
| 4,380,769 | 4/1983 | Thomas et al. ............ 346/135.1 |
| 4,388,400 | 6/1983 | Tabei et al. ............ 430/346 |

FOREIGN PATENT DOCUMENTS

24136  2/1981  European Pat. Off.
2727189  6/1977  Fed. Rep. of Germany.

Primary Examiner—E. A. Goldberg
Assistant Examiner—Gerald E. Preston
Attorney, Agent, or Firm—John R. Everett

[57] ABSTRACT

A recording element comprising a support having thereon a heat-deformable optical recording layer having a transparent ceramic overcoat characterized in that the overcoat has a thickness up to about 0.05 μm is disclosed.

10 Claims, 5 Drawing Figures

FIG. 5

CERAMIC OVERCOATED OPTICAL RECORDING ELEMENT

FIELD OF THE INVENTION

This invention relates to optical recording elements particularly optical recording elements having heat-deformable recording layers overcoated with a ceramic layer.

BACKGROUND OF THE INVENTION

Recording elements in which information is recorded by thermally deforming an optical recording layer are known. Such elements are useful in rapidly recording large amounts of digital information in a small area. These elements are also useful in recording video information.

Recording on an optical recording element is accomplished by a beam of high energy-density radiation such as a laser beam. The laser beam is focused onto the surface of the optical recording layer of the element. The recording layer absorbs energy from the laser so that a small portion of the layer is deformed. The deformation may be in the form of pits, holes or other changes in the material. This technique of optical recording on a heat-deformable recording layer is usually referred to in the optical recording art as "ablative recording".

Generally, there is continuous relative motion between the laser beam and the layer so that as the laser is pulse modulated, discrete deformations of varying sizes are created in the layer. The sizes and spacing of these deformations constitute the encoded information. A variety of materials have been proposed for use for the heat-deformable recording layer.

It is also known to overcoat the heat-deformable optical recording layer for a variety of purposes. For example, during the ablative recording process, a portion of the optical recording layer is removed in the form of a vapor which condenses and rains back upon the recording layer creating the potential for unwanted noise. To overcome this problem, U.S. Pat. No. 4,069,487 disclosed protective overcoats of ceramic material. These overcoats range in thickness of from 0.15 to 10 $\mu$m.

The problem is that the relatively thick overcoats described in U.S. Pat. No. 4,069,487 have a deleterious effect upon the laser write sensitivity, and upon carrier-to-noise ratio (CNR) and recording linearity of recorded information in ablative materials. This deleterious effect impedes the use of relatively inexpensive low power diode lasers now being considered for use in optical recording systems.

SUMMARY OF THE PRESENT INVENTION

Applicants have largely overcome the foregoing problems by providing a recording element comprising a support having thereon a heat-deformable optical recording layer having a transparent ceramic overcoat characterized in that the overcoat has a thickness up to 0.05 $\mu$m.

The recording elements of this invention having the thin ceramic overcoats up to 0.05 $\mu$m suffer essentially no loss in recording sensitivity. Recorded information on the elements have excellent carrier-to-noise ratio (CNR) and linearity (variance of length of recorded deformations with laser on time). Moreover, diode lasers can be used to record and readback recorded information.

The invention provides a recording element and process useful for high-quality, high-information density recording. "High-quality recording" as used herein is defined as a recording which, when read back, has a carrier-to-noise ratio at a 30 KHZ slot-noise bandwidth greater than or equal to 40 decibels and few imperfections or dropouts.

In another aspect, the present invention provides an information record element comprising a support having thereon a record bearing heat-deformed optical recording layer overcoated with a transparent ceramic overcoat characterized in that the overcoat (a) has a thickness up to about 0.05 $\mu$m and (b) comprises a dome-like structure over each of the heat-deformations in the record bearing layer.

PREFERRED EMBODIMENTS OF THE INVENTION

In a preferred embodiment, the present invention provides a recording element comprising a support having thereon a heat-deformable optical recording layer characterized in that the optical recording layer
 (a) is an amorphous layer of a dye and a binder;
 (b) has an absorption factor of at least 20 at a first wavelength and is substantially transparent at a second wavelength;
 (c) is capable of being thermally deformed by a beam of high energy density radiation of the first wavelength to form a deformation comprising a hole or depression surrounded by a sharply defined ridge; and
 (d) a ceramic overcoat having a thickness up to 0.05 $\mu$m.

In another aspect, the present invention provides in a preferred embodiment, an information bearing record element comprising a support having thereon a record bearing heat-deformed optical recording layer characterized in that the record bearing optical recording layer
 (a) is an amorphous layer of a dye and a binder;
 (b) has an absorption factor of at least about 20 at a first wavelength and is substantially transparent at a second wavelength;
 (c) has a plurality of deformations comprising a hole or depression surrounded by a sharply defined ridge;
 (d) has a ceramic overcoat having a thickness up to 0.05 $\mu$m; and
 (e) comprises a dome-like structure over each of the holes or depressions in the record bearing optical recording layer.

DETAILS OF THE INVENTION

Figures 1, 2:
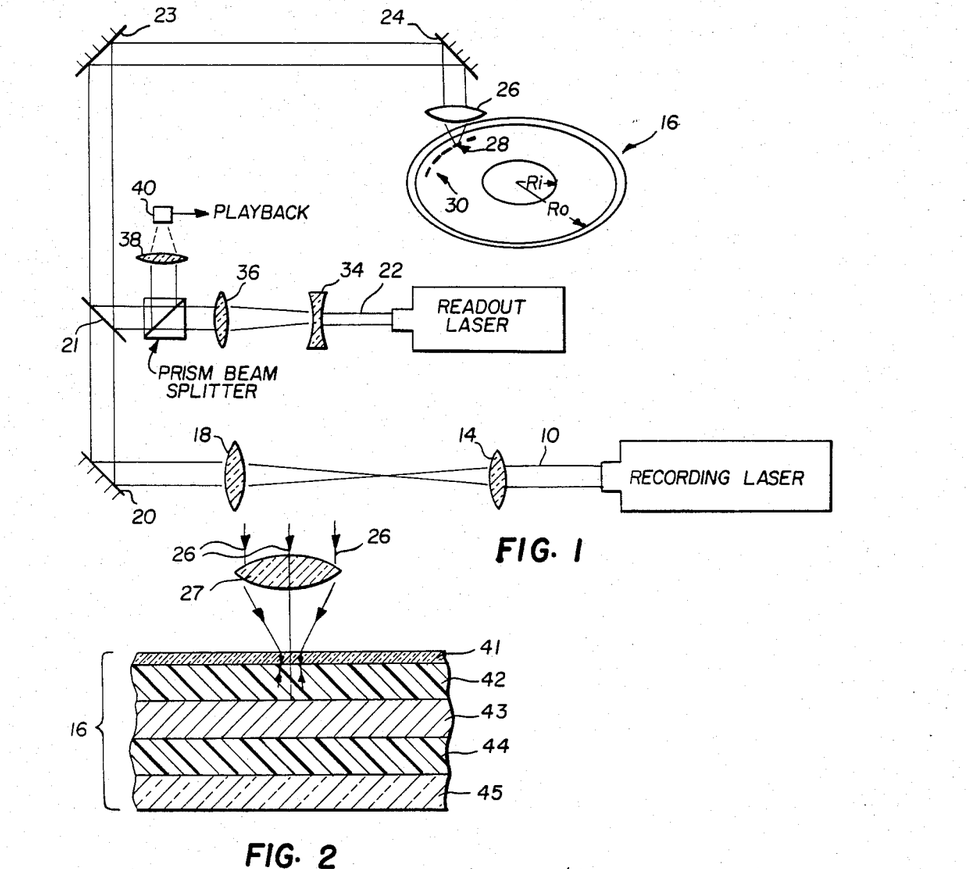
FIG. 1 shows a schematic apparatus for recording and reading back information on the recording elements of the invention.
FIGS. 2 and 3 show a cross section of a recording element of the invention before and after recording respectively.

FIG. 1 shows apparatus for recording information on a recording element 16 and for playing back information therefrom. Recording element 16 comprises, as shown in FIG. 2, an overcoat layer 41, heat-deformable amorphous optical recording layer 42 reflecting layer 43 surface smoothing layer 44 and substrate 45. In response to a drive signal, the intensity of a diode recording beam 10 is modulated in accordance with information to be recorded on recording element 16. The modulated laser beam is collected by a lens 14 and collimated by a lens 18 and is directed by means of mirror elements 20, 23 and 24 to a high numerical aperture lens 26 which focuses the modulated laser beam to a recording spot 28 on the recording element 16.

During recording, the recording element 16 is spun at a constant rate, e.g., 1800 rotations per minute (rpm). As a result, a track of information 30 is recorded on the optical recording layer and recording element 16 resulting in an information bearing recording element. As recording continues, the recording spot 28 is caused (by means not shown) to scan radially inward across the recording element 16, thereby causing information deformations to be recorded along a spiral track that extends from an outer radius $R_o$ to an inner radius $R_i$. The sizes and spacings of the recorded information marks vary in accordance with the information content of the recording laser drive signal, as well as with radial position on the recording element 16.

Figure 3:
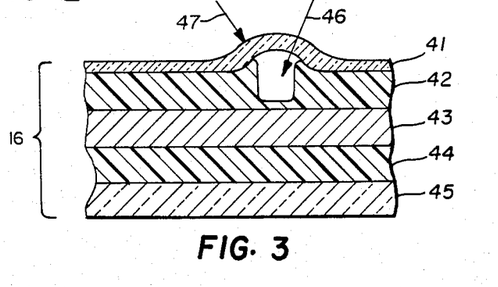

When the recordings are carried out on the preferred ceramic overcoated optical elements of the present invention, the optical recording layer deforms to form pits surrounded by a sharply defined ridge. In addition, the ceramic overcoat forms a dome-like structure over the pit. FIG. 3 is a cross section of recording element 16 after information has been recorded showing a pit 46 and the associated dome 47. By "sharply defined ridge" is meant that the ridge and hole/depression have noticeable boundaries and that, as measured in the plane of the undeformed outer surface of the layer and in the direction of relative motion, if any, between the recording beam and the layer, the width of the ridge is less than or equal to the breadth of the hole/depression. This includes the case where the ridge itself is not noticeable but the hole/depression is sharply defined.

During the readback process, the now information bearing record element 16 is spun at the same rate as it was spun during the recording process. A laser beam 22 from a readout laser is expanded in diameter by means of lenses 34 and 36. The optical path of the readout laser beam is folded by a beam splitter 21 and mirrors 23 and 24 so that the readout laser beam is focused to a playback spot on the recording element 16 by the high numerical aperture lens 26. The recording disk 16 is assumed to be of the reflective type so that the radiation forming the playback spot is reflected back through the high numerical aperture lens 26 after interacting with the information marks recorded on the optical element 16. (In the case of a transmissive optical element, the playback optical system would be arranged so that the playback spot would pass through the optical disk in order to interact with recorded information marks.) A lens 38 directs reflected laser radiation which has been diverted by the prism beamsplitter onto a detector 40 which produces an electrical playback signal in response to temporal variations in the irradiance of the reflected laser radiation falling on the detector.

Useful ceramic overcoat materials are transparent at the read and write laser wavelength(s). Such overcoats should also have
 (1) low thermal diffusivity to avoid heat loss to the overcoat during recording;
 (2) low adhesion to the optical recording layer;
 (3) high viscosity under high temperature to avoid excessive flow during pit formation; and
 (4) be coatable in a continuous, homogenous film on the optical recording layer.

Desirably, the overcoat material should be as stable as possible. Useful ceramic materials include aluminum oxide, silicon monoxide SiO, $Al_2O_3$, silicon dioxide $SiO_2$, silica, glass such as Schott-Glass ® (available from Schott Glass Company), quartz and magnesium fluoride ($MgF_2$).

A heat-deformable optical recording layer is any layer which is capable of undergoing thermal deformation when exposed to a beam of high energy-density radiation such as a laser beam. Deformations have been referred to in the art as pits, craters, depressions and cavities. Useful layers include thin vacuum-evaporated layers of metal such as bismuth, rhodium, titanium and platinum. Layers of vacuum-evaporated dyes are also useful, such as those described in U.S. Pat. No. 4,190,843 to Spong, issued Feb. 26, 1980. Bilayer and trilayer optical interference films are also useful. Useful recording layers also include chalcogenides such as those described in U.S. Pat. No. 4,069,487 to Kasai et al and solvent-coated dye-binder layers.

Preferred recording layers are the subject of U.S. Pat. No. 4,380,769 granted Apr. 19, 1983 to Thomas et al. The layers are amorphous dye-binder layers having an absorption factor greater than 20. The "absorption factor" of the amorphous material is defined as the product of the weight fraction of dye included in the amorphous material and the molar extinction coefficient of the dye at the wavelength of the recording beam of choice, divided by the molecular weight of the dye (MW), and having the units of liter per gm-cm.

Thus, optical recording layer 42 preferably should have a very high optical density, i.e., an absorption factor of 20 or greater at the wavelength of the recording beam of choice, in order to be able to absorb sufficient energy from the recording beam to undergo proper thermal deformation. (It will be readily appreciated that absorption factor is thickness-independent, while for a given dye-binder composition optical density is thickness-dependent. However, if the composition has an absorption factor greater than 20, even thin layers have a high density.) The layer 42 has a glass transition temperature significantly higher than room temperature and lower than the temperature which is imparted during recording to a point on the layer by the recording beam of choice. Otherwise, the layer 42 is not able to retain the thermal deformation pattern after recording or is not capable of being recorded upon at all. A useful range of glass transition temperatures for layer 42 is preferably between about 40° C. and about 150° C., although higher and lower glass transition temperature materials are also useful.

Depending upon the desired mode of reading the recording element of the present invention, the support for the element is either reflective or transparent. In the case of a reflective support, both sides of the support are optionally reflective and an optical recording layer, along with its associated ceramic overcoat layer, is coated on both sides of the support. The support itself is any of a wide variety of materials including glass, a self-supporting plastic such as poly(ethylene terephthalate), cellulose acetate, poly(methyl methacrylate), poly(vinyl chloride) and polystyrene, or a metal such as an aluminum sheet. It is desirable that the support have a relatively high melting point in order to avoid deformation of the support during recording. The support is desirably very smooth to minimize noise and dropouts in the recording-playback process. In certain preferred embodiments, the support is coated with a smoothing layer prior to the coating of the reflective surface and the other layers of the optical recording element described herein.

The composition which is used for the smoothing layer is preferably a low-viscosity, polymerizable fluid which is coated on the surface of the support. Following coating, polymerization of the fluid produces a microsmooth surface on the support. The support is then made reflective by vacuum metalization of the smooth surface such as by evaporating aluminum onto the smoothed surface of the support. In preferred embodiments, the polymerizable fluid comprises photopolymerizable monomers. Preferably, the monomers or mixtures of monomers are low-viscosity fluids in the absence of a solvent. Useful polymerizable fluid compositions are described in U.S. Pat. No. 4,092,173 and U.S. Pat. No. 4,171,979.

The thickness of the heat-deformable optical recording layer 42 is preferably less then 0.45 $\mu$m. While high-absorption-factor layers of conventional thickness, i.e., 1–10 $\mu$m or greater, produce excellent recordings which are readable with a nonabsorbed read beam, exceptionally thin layers provide further improvements in carrier-to-noise ratio. For example, for a given material, recorded information played back from a layer with a thickness less then 0.45 $\mu$m usually has a carrier-to-noise ratio which is as many as 3 decibels greater than the playback from a 2 $\mu$m layer. In particularly preferred embodiments of the invention, layer 42 is less than 0.35 $\mu$m thick.

The selected dye must be compatible with the binder. By "compatible" is meant that the dye is capable of being mixed with the binder in sufficient concentration to provide the required absorption factor without crystallizing after the layer is dried. Layer 42 must be amorphous. The mixture generally comprises 1 part binder or mixture of binders by weight and 1 part dye or mixture of dyes by weight, but in some cases it is desirable to increase or decrease the proportion of binder in the mixture. In some cases, it is also useful to include a plasticizer in the mixture to achieve the desired deformation capabilities. In preferred embodiments, the amorphous material is soluble in an organic solvent such as cyclohexanone, acetone, benzene or xylene.

Useful binders are, for example, cellulose acetate butyrates, cellulose nitrate, polystyrenes, polysulfonamides, polycarbonates, cellulose nitrate, hydroabietyl alcohol (sold by the Hercules Chemical Co. as Abitol ™ AUK 257), poly(ethyl methacrylate), poly(vinyl butyral) and combinations and derivatives thereof. The preferred binder is a material comprising a mixture of non-polymeric compounds. The mixture is (a) amorphous, (b) solid at about 20° C., and (c) comprises at least two different compounds each having at least two linking components joining one multivalent organic nucleus with at least two organic nuclei wherein at least one of the multivalent organic nuclei is a multicyclic or aromatic nucleus. Examples of such binders are presented in Table I.

TABLE I

TABLE I-continued

Such binders are the subject of U.S. patent application No. 473,825, filed Mar. 9, 1983, entitled "Binder-Mixtures for Optical Recording Elements". The latter application is expressly incorporated herein by reference.

The dye is chosen for its compatibility with the binder of choice, as discussed above, and for high absorptivity at the wavelength of the recording beam of choice. Innumerable dyes are available. Many such dyes are disclosed in U.S. Pat. Nos. 4,415,621 and 4,380,769 and now allowed U.S. patent application No. 391,769, filed June 24, 1982 and *Research Disclosure,* Item 21638, April 1982, page 117, published by Industrial Opportunities, Ltd. 13-14 Homewell, Havent, Hampshire, England.

Preferred dyes include the metal dithiene dyes of the aforementioned *Research Disclosure.* Examples of such dyes are presented in Table II.

TABLE II

1.

2.

3.

Another group of preferred dyes are the oxoindolizium dyes of the aforementioned U.S. patent application No. 391,769. Examples of such dyes are present in Table III.

TABLE III

1.

2.

3. A mixture of isomers as follows:

35% and

65%.

The following examples are presented to illustrate the effect of ceramic overcoats on the laser write sensitivity and on the laser read/write performance of recording elements as reflected in carrier-to-noise ratios and linearity of recording from bit error rate measurements.

Laser write sensitivity of the overcoated recording elements 16 of the invention, compared to an unovercoated control, was determined by determining the laser power needed in each instance to write, i.e., form the proper pits to achieve the CNR obtained with the unovercoated control.

Laser read/write performance of uncoated and ceramic overcoated optical recording layer 42 was determined by measuring carrier-to-noise ratio and bit error rate to determine the linearity of a recording. To carry out the foregoing measurements, recordings and readback were carried out on the following basic optical recording element. The element was used as a control without a ceramic overcoat and as an example of the invention when overcoated with a ceramic material at a thickness less than 0.05 μm. The overcoating was carried out by vacuum deposition.

Three different recording elements were prepared as follows. A 300-mm-diameter circular glass substrate was spin-coated with a surface-smoothing composition by flooding the glass substrate with the smoothing composition at low rpm (about 80–100 rpm) and then leveling the coating by advancing the speed to about 500 rpm. The surface-smoothing composition comprised:

| | |
|---|---|
| pentaerythritol tetraacrylate | 20 g |
| a low-viscosity urethane-acrylate monomer (UV-curable Topcoat 874-C-2002 ™ Fuller O'Brien Corp.) | 20 g |
| 2-ethoxyethanol | 60 g |
| a coumarin sensitizer composition | 3 g |
| surfactant | 3 drops |

The coated and dried surface-smoothing composition was cured by irradiating with a 3000-watt pulsed xenon arc lamp at 18 inches for 4 minutes.

The thus smoothed surface of the substrate was then coated with a 0.05 μm thick reflecting layer of aluminum by vapor deposition.

A coating composition comprising a 1:1 mixture of a dye, or a mixture of dyes, and a binder dissolved in bromobenzene were prepared. The coating composition was spin coated on the reflecting layer at a low rpm and then leveled at about 800 rpm.

Using the above procedure, two different recording elements were prepared which were identical except for the optical recording layers. The layers had the following composition:
Optical Recording Element 1
1 part of a 1:1 mixture of dyes 2 and 3 from Table II plus 1 part of binder 1 from Table I
Optical Recording Element 2
1 part dye 3 from Table III plus 1 part of binder 3 from Table I.

After drying, the recording elements were ready for use as a control or overcoated to form an element of this invention. Overcoating of the element was carried out by vacuum deposition.

Recordings were carried out using a 830 nm diode laser with the recording element 16 revolving at 1800 rpm. A carrier signal of 8.8 MHz was recorded. To determine carrier-to-noise ratio, the record bearing element was played back while being spun at the recording spin rate. The readout was carried out with a He-Ne laser.

EXAMPLE 1

0.01 μm Glass Overcoat

Figure 4:
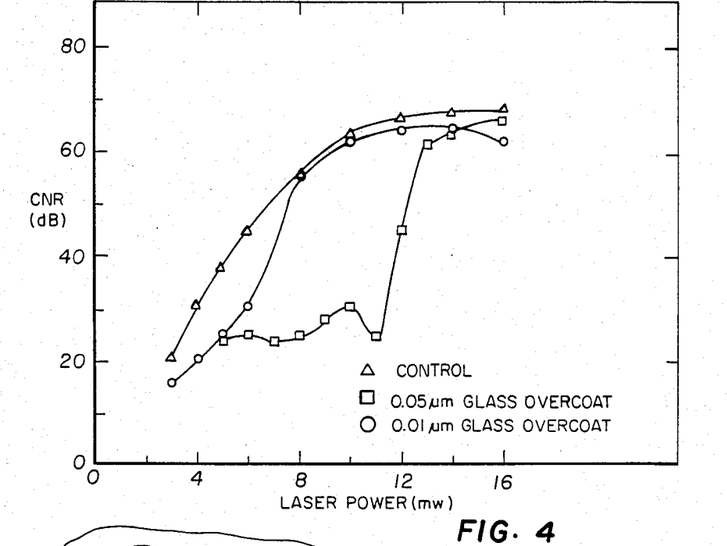
FIG. 4 shows CNR versus laser power curves for a control and the ceramic overcoated recording elements of Examples 1 and 2 infra.

Optical Recording Element No. 1 was used in this example. The carrier-to-noise ratio in decibels was determined for a control recording element without an overcoat and with 0.01 μm Schott-Glass ® overcoat. The carrier-to-noise ratio was determined by recording at a series of laser powers and measuring CNR at each power level. Those results are shown in the curves of FIG. 4. Those curves show that between laser powers of about 12 to 16 mW excellent carrier-to-noise ratios in excess of 60 are achieved for both the control and the overcoated sample. While the carrier-to-noise ratio of the control is slightly higher than that of the overcoated element, the difference is only about 4-5 decibels indicating essentially no effect on the carrier-to-noise ratio by the 0.01 μm Schott-Glass overcoat. In both cases high quality recordings are achieved. These measurements also show that the sensitivity of the control and the 0.01 Schott-Glass overcoated element are substantially equivalent in that a high CNR was achieved with both elements using the same amount of laser power.

FIG. 4 also shows that when readback is obtained through the use of a laser that is absorbed by the recording medium, the laser power which will accomplish the reading without damaging the recorded information, is more easily defined. That is the curve of CNR versus the laser power of FIG. 4 shows that the 0.01 μm glass overcoated recording element has a sharper slope between about 6 and 8 mW than that of the control. This means that one is better able to choose a read-back power along the slope of the curve which is less likely to cause damage to the recorded information compared to the control.

Figure 5:
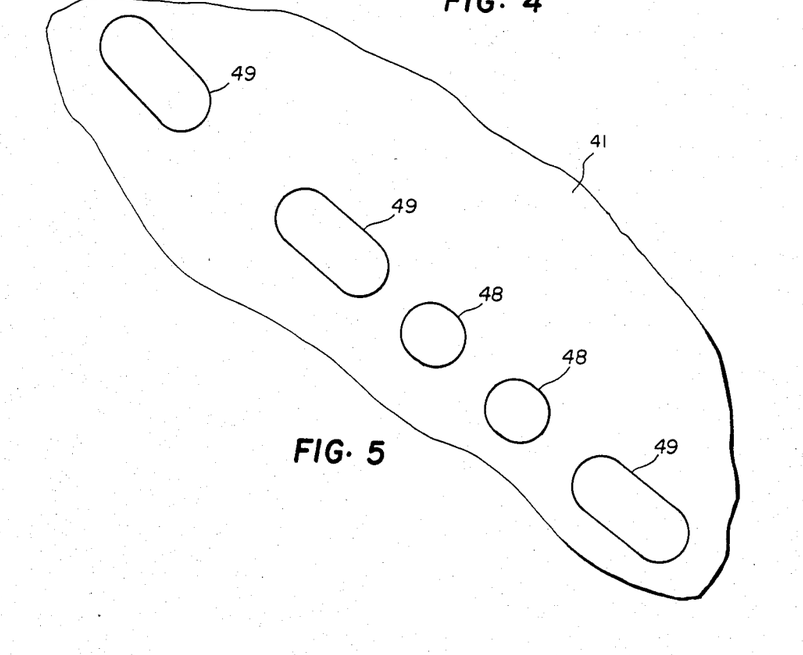
FIG. 5 is a drawing of a scanning electon micrograph of the pits formed in Example 1.

Basically there are two types of information which can be stored on recording elements of the type described herein. The types are FM encoded and digital. Digital data are first coded according to various types of codes available, such as Miller code or (2, 7) code. These coded data signals control the amount of time the pulsed recording diode laser is on and off according to the data pattern. The laser on and off times then determine the laser recorded pit length and pit to pit spacing. So, during digital recording, pits of various lengths are formed. The length of pit must vary linearly with laser on time. For example, if a laser is on for a time t and the recorded pit length is l, then pit length should be nl for a laser on time of nt. FIG. 5 is a reproduction of a scanning electron photomicrograph which shows the linearity of the recordings made on the 0.05 μm glass overcoated recording element. Pit 48 for which the recording laser pulse length was 0.200 μsec. at 450 rpm is exactly 0.5 times the length of pits 49 which were recorded with 0.400 μsec. pulses.

This linear behavior is obtained because ceramic overcoats up to 0.05 μm thick do not impede the flow of the heated recording layer 42 during pit formation. The overcoat forms a dome 47 over the pit, allowing the recording medium to flow into rims.

To determine the effect of the 0.01 μm glass overcoat on bit error rate, and therefore the utility of ceramic overcoated optical recording elements for pulse modulated encoded digital recordings, the bit error rate was determined. The bit error rate was determined with a Schlumberger 721 Telemetry bit error rate detector and MFM encoding. This measurement resulted in a determination that the 0.01 μm glass overcoat exhibited four bit errors in 14761 sixteen bit words. This bit error rate was the same for the control. Thus, the glass overcoat had no detrimental effect on the bit error rate in digital recordings. This bit error rate data is also evidence that the recordings were linear as described hereinbefore.

EXAMPLE 2

0.05 μm Glass Overcoat

Optical Recording Element No. 1 was used in this example. Recording (laser writing) and playback (laser read) was conducted as in Example 1. Playback showed that the 0.05 μm Schott-Glass overcoated sample provided high quality recordings with the carrier-to-noise ratio greater than 60 decibels in the laser power range of 12–16 mW. This result is also shown in FIG. 4. This result shows that a 0.05 μm overcoat does not have a significant deleterious effect on laser write sensitivity. Again, it can be seen from FIG. 4 that the sharp slope of the CNR versus laser power curve for the 0.05 μm Schott-Glass overcoated sample is sharper than that of the control. Thus, one is able to choose a laser which is absorbed by the recorded information for read-back which falls along the sharp slope and thereby runs less risk of damaging the recorded information than in the case of the control.

EXAMPLE 3

0.005 μm MgF$_2$ Overcoat

Recording Element No. 1 was used in this example with 0.005 μm MgF$_2$ overcoat. The effect of the MgF$_2$ overcoat on carrier-to-noise ratio was determined as in Example 1. Recording and playback were carried out on a MgF$_2$ overcoated basic recording element described above. The CNR results show essentially no loss in laser write sensitivity and laser read performance compared to the control of Example 1.

Comparative Examples 4–5 show the adverse effect on recording linearity when overcoats thicker than 0.05 μm are used.

EXAMPLE 4

A 0.1 μm Glass Overcoat

Recording Element No. 2 was used in this example with a 0.1 μm Schott-Glass overcoat. The maximum carrier-to-noise ratio obtainable was less than 40 decibels at 1800 rpm with 8.8 MHz frequency on a glass support at a radius of 100 mm with 16 mW diode laser power. Using the standard digital recording conditions (5 Mb/sec, Miller Coded data, at disk speed 450 rpm, R=100 mm) the 0.1 μm Schott-Glass overcoated element could not be read back successfully. Bit error ratio could not be determined because of signal distortions and nonlinearities in laser recording caused by the 0.1 μm Schott-Glass overcoat.

EXAMPLE 5

A 0.3 μm Glass Overcoat

Recording Element No. 2 was used in this example with a 0.3 μm Schott-Glass overcoat. The maximum carrier-to-noise ratio was measured as 50 decibels at 1800 rpm, 8.8 MHz frequency on a glass substrate disk at a radius of 100 mm with 16 mW diode laser power. Under usual digital recording conditions (5 Mb/sec. Miller coded data, disk speed 450 rpm, radius 100 mm) bit error ratio measurements could not be performed because of nonlinearity in laser recordings with a 0.3 μm overcoat.

The invention has been described in detail with particular reference to preferred embodiments thereof, but it will be understood that variations and modifications can be effected within the spirit and scope of the invention.

We claim:

1. A recording element comprising a support having thereon a heat-deformable optical recording layer having a transparent ceramic overcoat characterized in that the optical recording layer
   (a) is an amorphous layer of a dye and a binder;
   (b) has an absorption factor of at least 20 at a first wavelength and is substantially transparent at a second wavelength;
   (c) is capable of being thermally deformed by a beam of high energy density radiation of the first wavelength to form a deformation comprising a hole or depression surrounded by a sharply defined ridge; and
   (d) the overcoat has a thickness up to 0.05 μm.

2. The recording element of claim 1 comprising a support having thereon in the following order:
   (a) a smoothing layer;
   (b) a metal reflection layer;
   (c) a heat-deformable optical recording layer; characterized in that the optical recording layer:
       (i) is an amorphous layer of a dye and a binder;
       (ii) has an absorption factor of at least about 20 at a first wavelength and substantially transparent at a second wavelength;
       (iii) is capable of being thermally deformed by a beam of high energy density radiation of said first wavelength to form a deformation comprising a hole or depression surrounded by a sharply defined ridge; and
       (iv) has a ceramic overcoat having a thickness up to 0.05 μm.

3. An information bearing record element comprising a support having thereon a record bearing heat-deformed optical recording layer having a transparent ceramic overcoat characterized in that the record bearing optical recording layer
   (a) is an amorphous layer of a dye and a binder;
   (b) has an absorption factor of at least about 20 at a first wavelength and is substantially transparent at a second wavelength;
   (c) has a plurality of deformations comprising a hole or depression surrounded by a sharply defined ridge;
   (d) has a ceramic overcoat having a thickness of up to about 0.05 μm; and
   (e) comprises a dome-like structure over each of the holes or depressions in the record bearing optical recording layer.

4. The information bearing record element of claim 3 comprising a support having thereon the following layers in the following order:
   (a) a smoothing layer;
   (b) a metal reflection layer; and
   (c) a recording bearing optical recording layer; characterized in that the record bearing optical recording layer
       (i) is a amorphous layer of a dye and a binder;
       (ii) has an absorption factor of at least 20 at a first wavelength and is substantially transparent at a second wavelength;
       (iii) has a plurality of deformations comprising a hole or depression surrounded by a sharply defined ridge;
       (iv) has a ceramic overcoat having a thickness up to 0.05 μm; and
       (v) comprises a dome-like structure over each of the holes or depressions in the record bearing optical recording layers.

5. The element of claim 1 or 3 wherein the ceramic layer is glass.

6. The element of claim 1 or 3 wherein the ceramic layer is Schott-Glass.

7. The element of claim 1 or 3 wherein the ceramic overcoat material is selected from the group consisting of $SiO_2$, $MgF_2$, $Al_2O_3$, SiO, quartz, silica and glass.

8. The element of claim 1 or 3 wherein the ceramic overcoat has a thickness up to 0.01 $\mu$m.

9. The element of claim 1 or 3 wherein the optical recording layer comprises a mixture of a dye and a binder wherein the dye is selected from the group consisting of nickel dithiene dyes and indolizinium dyes; and the binder is a mixture which is non-polymeric amorphous, solid at about 20° C. and comprises at least two different compounds each having at least two linking components joining one multivalent organic nucleus with at least two organic nuclei wherein at least one of the multivalent organic nuclei is a multicyclic aromatic nucleus.

10. The element of claim 1 or 3 wherein the dye is selected from the dyes of Table II and III and the binder is selected from the binders of Table I.

* * * * *